US011996632B2

(12) United States Patent
Chang et al.

(10) Patent No.: US 11,996,632 B2
(45) Date of Patent: May 28, 2024

(54) MOBILE DEVICE SUPPORTING WIDEBAND OPERATION

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 100 days.

(21) Appl. No.: 17/815,287

(22) Filed: Jul. 27, 2022

(65) Prior Publication Data

US 2023/0387591 A1 Nov. 30, 2023

(30) Foreign Application Priority Data

May 26, 2022 (TW) ................................ 111119606

(51) Int. Cl.

*H01Q 1/22* (2006.01)
*H01Q 5/307* (2015.01)
*H01Q 9/42* (2006.01)
*H01Q 13/16* (2006.01)

(52) U.S. Cl.

CPC ........... *H01Q 5/307* (2015.01); *H01Q 1/2266* (2013.01); *H01Q 9/42* (2013.01); *H01Q 13/16* (2013.01)

(58) Field of Classification Search

CPC ........ H01Q 5/307; H01Q 1/2266; H01Q 9/42; H01Q 13/16

See application file for complete search history.

(56) References Cited

U.S. PATENT DOCUMENTS

| | | | | |
|---|---|---|---|---|
| 6,943,733 | B2 | 9/2005 | Vance | |
| 8,779,987 | B2 * | 7/2014 | Endo ...................... | H01Q 1/243 343/702 |
| 2008/0198082 | A1 | 8/2008 | Soler et al. | |
| 2012/0194390 | A1 | 8/2012 | Endo et al. | |

FOREIGN PATENT DOCUMENTS

| | | |
|---|---|---|
| CN | 1875522 A | 12/2006 |

OTHER PUBLICATIONS

Chinese language office action dated Jun. 12, 2023, issued in application No. TW 111119606.

* cited by examiner

*Primary Examiner* — Graham P Smith
(74) *Attorney, Agent, or Firm* — McClure, Qualey & Rodack, LLP

(57) ABSTRACT

A mobile device supporting wideband operations includes a first radiation element, a second radiation element, a third radiation element, and a dielectric substrate. The first radiation element has a feeding point. The second radiation element is coupled to the ground voltage. The first radiation element is at least partially surrounded by the second radiation element. The feeding point is coupled through the third radiation element to the ground voltage. The first radiation element, the second radiation element, and the third radiation element are disposed on the dielectric substrate. An antenna structure is formed by the first radiation element, the second radiation element, and the third radiation element.

12 Claims, 3 Drawing Sheets

MOBILE DEVICE SUPPORTING WIDEBAND OPERATION

CROSS REFERENCE TO RELATED APPLICATIONS

This application claims priority of Taiwan Patent Application No. 111119606 filed on May 26, 2022, the entirety of which is incorporated by reference herein.

BACKGROUND OF THE INVENTION

Field of the Invention

The disclosure generally relates to a mobile device, and more particularly, to a mobile device supporting wideband operations.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient operational bandwidth, it may degrade the communication quality of the relative mobile device. Accordingly, it has become a critical challenge for designers to design a small-size, wideband antenna structure.

BRIEF SUMMARY OF THE INVENTION

In an exemplary embodiment, the invention is directed to a mobile device supporting wideband operations. The mobile device includes a first radiation element, a second radiation element, a third radiation element, and a dielectric substrate. The first radiation element has a feeding point. The second radiation element is coupled to the ground voltage. The first radiation element is at least partially surrounded by the second radiation element. The feeding point is coupled through the third radiation element to the ground voltage. The first radiation element, the second radiation element, and the third radiation element are disposed on the dielectric substrate. An antenna structure is formed by the first radiation element, the second radiation element, and the third radiation element.

In some embodiments, the total length of the antenna structure is shorter than or equal to 10 mm, and the total width of the antenna structure is shorter than or equal to 8 mm.

In some embodiments, the first radiation element substantially has an inverted L-shape.

In some embodiments, the second radiation element has a meandering shape for defining a notch region, and the first radiation element is at least partially disposed inside the notch region.

In some embodiments, the third radiation element substantially has an L-shape.

In some embodiments, a first coupling gap and a second coupling gap are formed between the first radiation element and the second radiation element. A third coupling gap is formed between the second radiation element and the third radiation element. The width of the first coupling gap is 0.5 mm to 0.8 mm. The width of the second coupling gap is 0.5 mm to 0.8 mm.

The width of the third coupling gap is 0.5 mm to 0.8 mm.

In some embodiments, the antenna structure covers a first frequency band and a second frequency band. The first frequency band is from 2400 MHz to 2500 MHz. The second frequency band is from 5150 MHz to 5850 MHz.

In some embodiments, the length of the first radiation element is substantially equal to 0.25 wavelength of the second frequency band.

In some embodiments, the length of the second radiation element is substantially equal to 0.25 wavelength of the first frequency band.

In some embodiments, the length of the third radiation element is from 6 mm to 8 mm.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
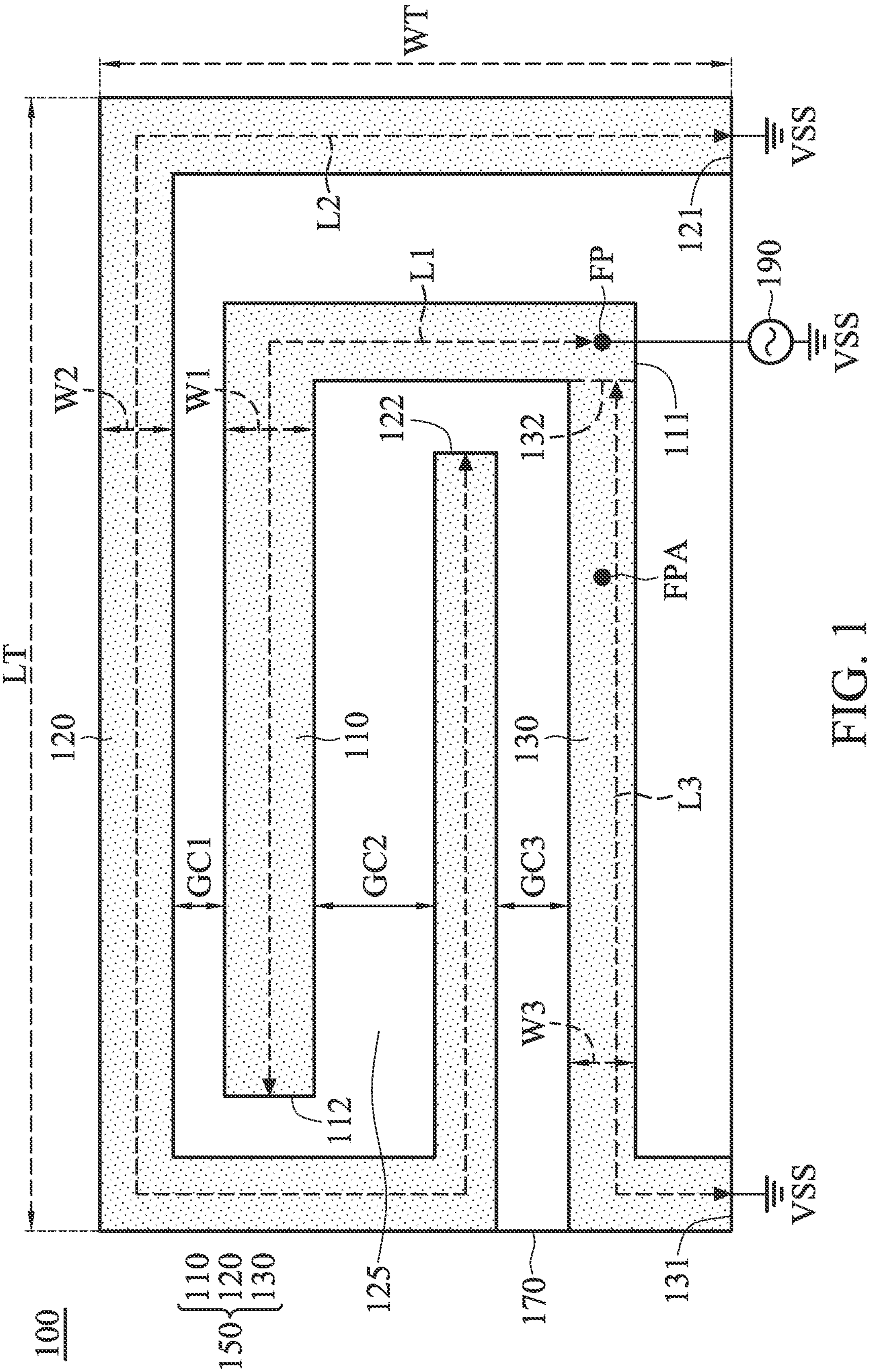
FIG. 1 is a diagram of a mobile device according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a mobile device 100 according to an embodiment of the invention. For example, the mobile device 100 may be a smart phone, a tablet computer, or a notebook computer. As shown in FIG. 1, the mobile device 100 includes a first radiation element 110, a second radiation element 120, a third radiation element 130, and a dielectric substrate 170. The first radiation element 110, the second radiation element 120, and the third radiation element 130 may all be made of metal materials, such as copper, silver, aluminum, iron, or their alloys. It should be understood that the mobile device 100 may further include other components, such as a processor, a touch control panel, a speaker, a power supply module, and/or a housing, although they are not displayed in FIG. 1.

The first radiation element 110 may substantially have an inverted L-shape. Specifically, the first radiation element has a first end 111 and a second end 112. A feeding point FP is positioned at the first end 111 of the first radiation element 110. The second end 112 of the first radiation element 110 is an open end. The feeding point FP may be further coupled to a signal source 190. For example, the signal source 190 may be an RF (Radio Frequency) module. It should be noted that the first radiation element 110 is at least partially surrounded by the second radiation element 120.

The second radiation element 120 may have a meandering shape for defining a notch region 125. The first radiation element 110 may be at least partially disposed inside the notch region 125. For example, the second end 112 of the first radiation element 120 may extend into the notch region 125. Specifically, the second radiation element 120 has a first end 121 and a second end 122. The first end 121 of the second radiation element 120 is coupled to the ground voltage VSS. The second end 122 of the second radiation element 120 is an open end. For example, the second end 112 of the first radiation element 120 and the second end 122 of the second radiation element 120 may substantially extend away from each other in opposite directions. The ground voltage VSS may be provided by a system ground plane (not shown) of the mobile device 100. In some embodiments, a first coupling gap GC1 and a second coupling gap GC2 are formed between the first radiation element 110 and the second radiation element 120.

The third radiation element 130 may substantially have an L-shape. Specifically, the third radiation element 130 has a first end 131 and a second end 132. The first end 131 of the third radiation element 130 is coupled to the ground voltage VSS. The second end 132 of the third radiation element 130 is coupled to the feeding point FP and the first end 111 of the first radiation element 110. That is, the feeding point FP is coupled through the third radiation element 130 to the ground voltage VSS. In some embodiments, a third coupling gap GC3 is formed between the second radiation element 120 and the third radiation element 130.

In a preferred embodiment, an antenna structure 150 of the mobile device 100 is formed by the first radiation element 110, the second radiation element 120, and the third radiation element 130. It should be noted that whole size of the antenna structure 150 is minimized. For example, the total length LT of the antenna structure 150 may be shorter than or equal to 10 mm, and the total width WT of the antenna structure 150 may be shorter than or equal to 8 mm.

The dielectric substrate 170 may be an FR4 (Flame Retardant 4) substrate, a PCB (Printed Circuit Board), or an FPC (Flexible Printed Circuit). The first radiation element 110, the second radiation element 120, and the third radiation element 130 may all be disposed on the same surface of the dielectric substrate 170, such that the antenna structure 150 may be a planar antenna structure. However, the invention is not limited thereto. In alternative embodiments, the first radiation element 110, the second radiation element 120, and the third radiation element 130 are disposed on different surfaces of the dielectric substrate 170, such that the antenna structure 150 may be a 3D (Three-Dimensional) antenna structure.

Figure 2:
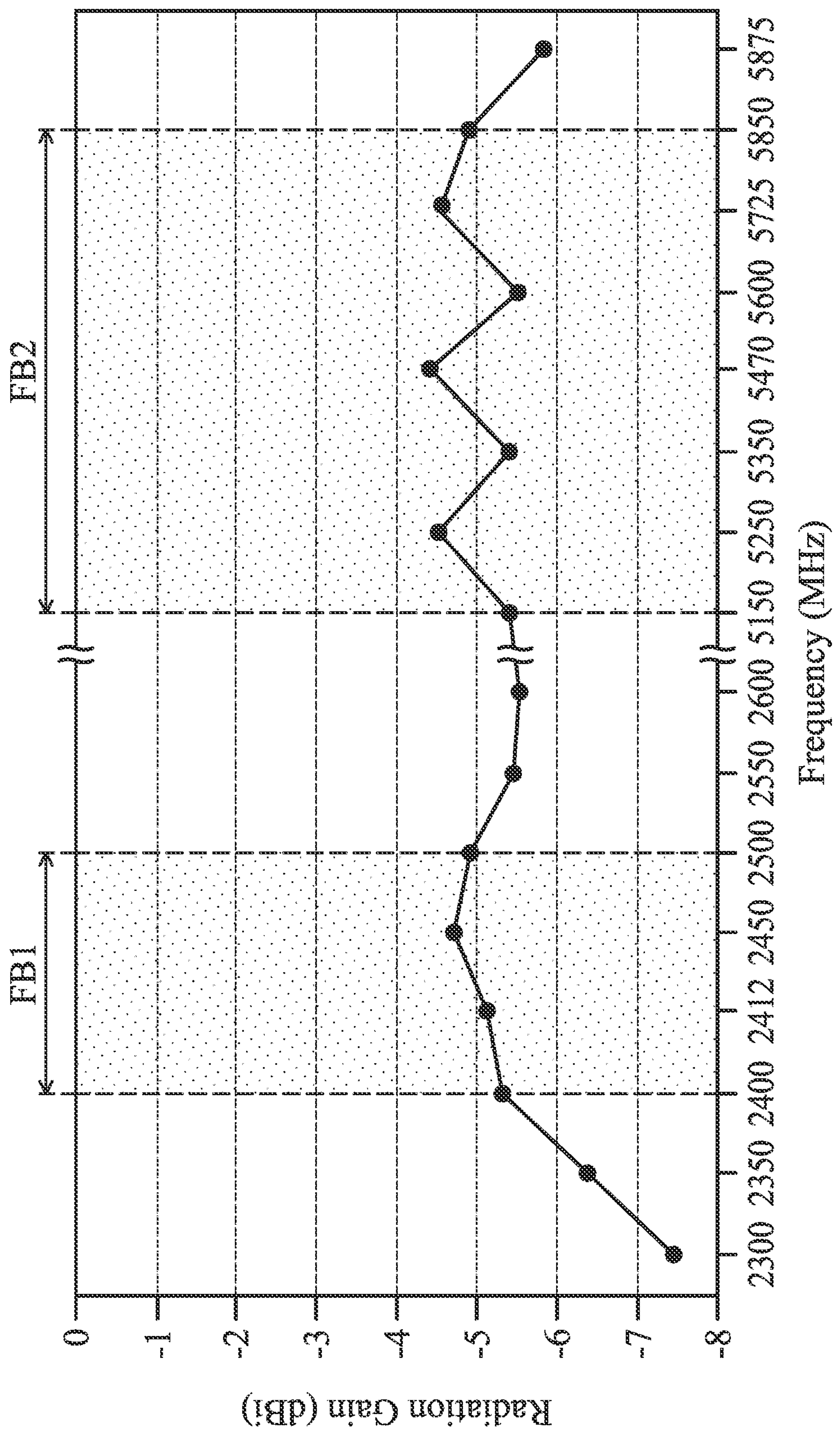
FIG. 2 is a diagram of radiation gain of an antenna structure of a mobile device according to an embodiment of the invention.

FIG. 2 is a diagram of radiation gain of the antenna structure 150 of the mobile device 100 according to an embodiment of the invention. The horizontal axis represents the operational frequency (MHz), and the vertical axis represents the radiation gain (dBi). According to the measurement of FIG. 2, the antenna structure 150 of the mobile device 100 can cover a first frequency band FB1 and a second frequency band FB2. For example, the first frequency band FB1 may be from 2400 MHz to 2500 MHz, and the second frequency band FB2 may be from 5150 MHz to 5850 MHz. Therefore, the mobile device 100 can support at least the wideband operations of WLAN (Wireless Local Area Network) 2.4 GHz/5 GHz.

In some embodiments, the operational principles of the antenna structure 150 are as follows. The first radiation element 110 is excited to generate the second frequency band FB2. The second radiation element 120 is excited by the first radiation element 110 using a coupling mechanism, so as to generate the first frequency band FB1. In addition, the third radiation element 130 is configured to fine-tune the impedance matching of the first frequency band FB1 and the second frequency band FB2, thereby increasing the operational bandwidth of the first frequency band FB1 and the second frequency band FB2.

In some embodiments, the element sizes of the mobile device 100 are as follows. The length L1 of the first radiation element 110 may be substantially equal to 0.25 wavelength ($\lambda/4$) of the second frequency band FB2 of the antenna structure 150. The width W1 of the first radiation element 110 may be from 0.5 mm to 1 mm. The length L2 of the second radiation element 120 may be substantially equal to 0.25 wavelength ($\lambda/4$) of the first frequency band FB1 of the antenna structure 150. The width W2 of the second radiation element 120 may be from 0.5 mm to 1 mm. The length L3 of the third radiation element 130 may be from 6 mm to 8 mm. The width W3 of the third radiation element 130 may be from 0.5 mm to 1 mm. The width of the first coupling gap GC1 may be from 0.5 mm to 0.8 mm. The width of the second coupling gap GC2 may be from 0.5 mm to 0.8 mm.

The width of the third coupling gap GC3 may be from 0.5 mm to 0.8 mm. The above ranges of element sizes and parameters are calculated and obtained according to many experiment results, and they help to optimize the operational bandwidth and impedance matching of the antenna structure 150 of the mobile device 100.

In alternative embodiments, the signal source 190 is coupled to an auxiliary feeding point FPA on the third radiation element 130, instead of the original feeding point FP. According to practical measurements, such a feeding modification can fine-tune the whole impedance matching of the antenna structure 150, so as to meet different requirements of designs.

Figure 3:
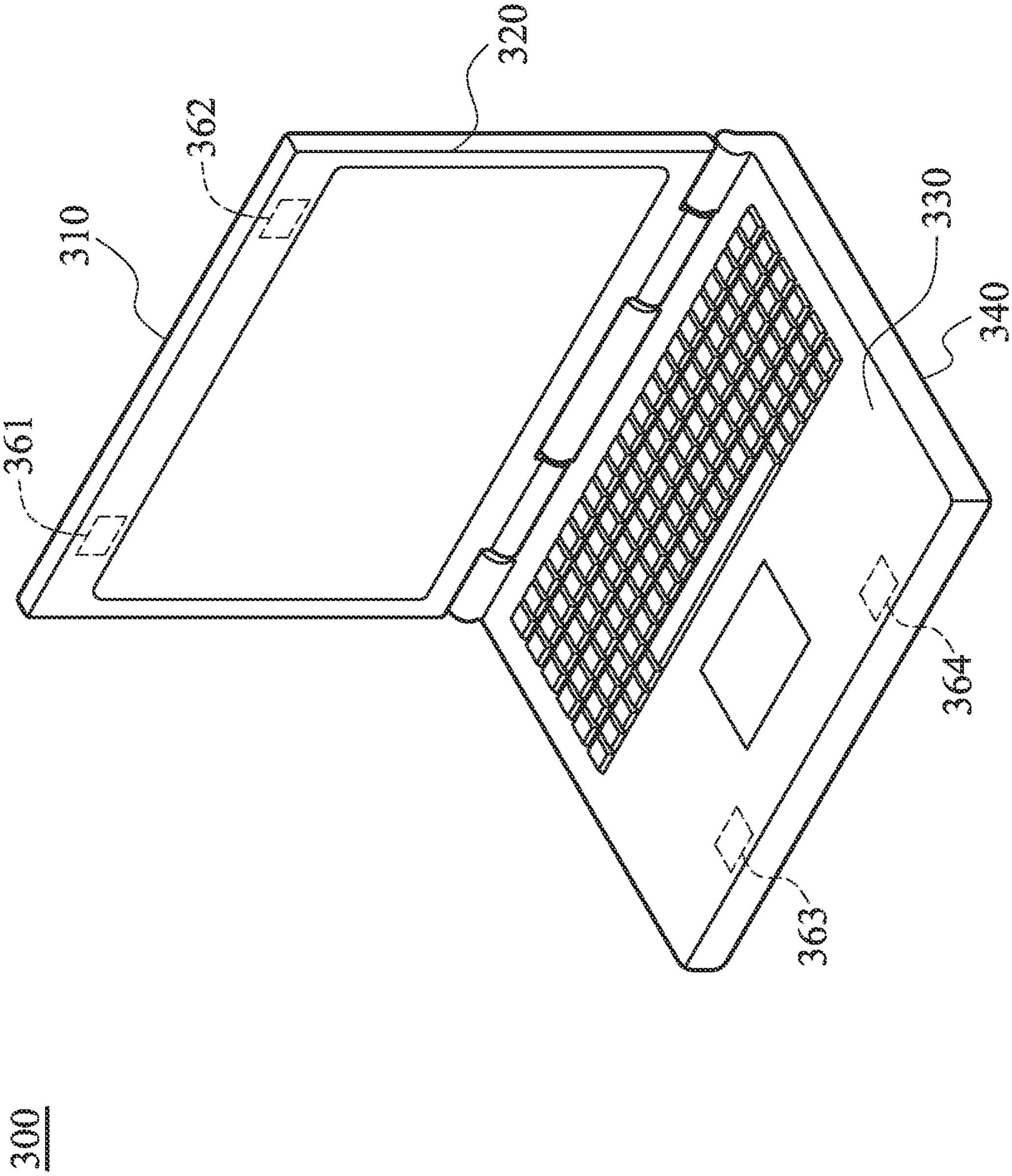
FIG. 3 is a perspective view of a notebook computer according to an embodiment of the invention.

FIG. 3 is a perspective view of a notebook computer 300 according to an embodiment of the invention. In the embodiment of FIG. 3, the aforementioned antenna structure 150 is applied to the notebook computer 300. The notebook computer 300 includes an upper cover housing 310, a display frame 320, a keyboard frame 330, and a base housing 340. It should be understood that the upper cover housing 310, the display frame 320, the keyboard frame 330, and the base housing 340 are equivalent to the so-called "A-component", "B-component", "C-component", and "D-component" in the field of notebook computers, respectively. The aforementioned antenna structure 150 may be disposed at a first position 361 and/or a second position 362 of the notebook computer 300, and it may be covered by the nonconductive display frame 320. Alternatively, the aforementioned antenna structure 150 may be disposed at a third position 363 and/or a fourth position 364 of the notebook computer 300, and it may be covered by the nonconductive keyboard frame 330. According to practical measurements, since the whole antenna size of the invention is very small, the proposed design can be applied to a variety of mobile devices with narrow borders, and it can also keep good communication quality and operational bandwidth. In some embodiments, the notebook computer 300 uses a plurality of antenna structures 150, so as to support the wideband operations of MIMO (Multi-Input and Multi-Output).

The invention proposes a novel mobile device with a novel antenna structure. In comparison to the conventional design, the invention has at least the advantages of small size, wide bandwidth, and low manufacturing cost. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the mobile device of the invention is not limited to the configurations of FIGS. 1-3. The invention may merely include any one or more features of any one or more embodiments of FIGS. 1-3. In other words, not all of the features displayed in the figures should be implemented in the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile device supporting wideband operations, comprising:
- a first radiation element, having a feeding point;
- a second radiation element, coupled to a ground voltage, wherein the first radiation element is at least partially surrounded by the second radiation element;
- a third radiation element, wherein the feeding point is coupled through the third radiation element to the ground voltage; and
- a dielectric substrate, wherein the first radiation element, the second radiation element, and the third radiation element are disposed on the dielectric substrate;
- wherein an antenna structure is formed by the first radiation element, the second radiation element, and the third radiation element;
- wherein a first coupling gap and a second coupling gap are formed between the first radiation element and the second radiation element;
- wherein a third coupling gap is formed between the second radiation element and the third radiation element;
- wherein a width of each of the first coupling gap, the second coupling gap, and the third coupling gap is from 0.5 mm to 0.8 mm.

2. The mobile device as claimed in claim 1, wherein a total length of the antenna structure is shorter than or equal to 10 mm.

3. The mobile device as claimed in claim 1, wherein a total width of the antenna structure is shorter than or equal to 8 mm.

4. The mobile device as claimed in claim 1, wherein the first radiation element substantially has an inverted L-shape.

5. The mobile device as claimed in claim 1, wherein the second radiation element has a meandering shape for defining a notch region.

6. The mobile device as claimed in claim 5, wherein the first radiation element is at least partially disposed inside the notch region.

7. The mobile device as claimed in claim 1, wherein the third radiation element substantially has an L-shape.

8. The mobile device as claimed in claim 1, wherein the antenna structure covers a first frequency band and a second frequency band.

9. The mobile device as claimed in claim 8, wherein the first frequency band is from 2400 MHz to 2500 MHz, and the second frequency band is from 5150 MHz to 5850 MHz.

10. The antenna structure as claimed in claim 8, wherein a length of the first radiation element is substantially equal to 0.25 wavelength of the second frequency band.

11. The antenna structure as claimed in claim 8, wherein a length of the second radiation element is substantially equal to 0.25 wavelength of the first frequency band.

12. The antenna structure as claimed in claim 1, wherein a length of the third radiation element is from 6 mm to 8 mm.

* * * * *